US009429693B2

(12) United States Patent
Takahashi

(10) Patent No.: US 9,429,693 B2
(45) Date of Patent: Aug. 30, 2016

(54) HIGH-ORDER MODE FILTER

(71) Applicant: NEC Corporation, Minato-ku, Tokyo (JP)

(72) Inventor: Shigeki Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 16 days.

(21) Appl. No.: 14/429,166

(22) PCT Filed: Jun. 18, 2013

(86) PCT No.: PCT/JP2013/066709
§ 371 (c)(1),
(2) Date: Mar. 18, 2015

(87) PCT Pub. No.: WO2014/050230
PCT Pub. Date: Apr. 3, 2014

(65) Prior Publication Data
US 2015/0253471 A1 Sep. 10, 2015

(30) Foreign Application Priority Data
Sep. 25, 2012 (JP) .................................. 2012-211015

(51) Int. Cl.
*G02B 5/20* (2006.01)
*G02B 6/122* (2006.01)
*G02F 1/35* (2006.01)
(Continued)

(52) U.S. Cl.
CPC ................ *G02B 5/20* (2013.01); *G02B 6/122* (2013.01); *G02F 1/3501* (2013.01); *G02F 1/365* (2013.01); *G02B 6/14* (2013.01); *G02B 2006/12097* (2013.01); *G02B 2006/12109* (2013.01);
(Continued)

(58) Field of Classification Search
CPC .............. G02B 6/122; G02B 2006/12097; G02B 2006/12109; G02B 5/20; G02B 1/14; G02B 2006/121126; G02F 1/3501; G02F 1/365; G02F 2001/3509; G02V 2001/3509
See application file for complete search history.

(56) References Cited

U.S. PATENT DOCUMENTS

| | | | | |
|---|---|---|---|---|
| 4,328,469 A | * | 5/1982 | Scifres | H01S 5/20 372/45.01 |
| 5,093,884 A | * | 3/1992 | Gidon | G02B 6/125 216/24 |

(Continued)

FOREIGN PATENT DOCUMENTS

| | | |
|---|---|---|
| JP | H05-72432 A | 3/1993 |
| JP | 4094756 B2 | 7/2000 |

(Continued)

OTHER PUBLICATIONS

International Search Report for PCT Application No. PCT/JP2013/066709, mailed on Aug. 27, 2013.

*Primary Examiner* — Peter Radkowski

(57) ABSTRACT

A rib waveguide type high-order mode filter includes a plate-like slab region 1; a projection portion 2 formed in a stripe along a waveguiding direction of light on the slab region 1; and a mesa region 4 having a bottom surface positioned at the same level as that of the bottom surface of the slab region 1 and a top surface positioned at a higher level than that of the top surface of the slab region 1, on at least one side of the slab region 1, wherein the projection portion 2, the slab region 1, and the mesa region 4 are made of the same material; and the mesa region 4 includes a doped area 4a in which an optical-absorption function is added by impurity doping into the material.

19 Claims, 13 Drawing Sheets

(51) Int. Cl.
*G02F 1/365* (2006.01)
*G02B 6/14* (2006.01)
*G02B 6/12* (2006.01)

(52) U.S. Cl.
CPC ............... *G02B2006/12126* (2013.01); *G02F 2001/3509* (2013.01)

(56) References Cited

U.S. PATENT DOCUMENTS

| | | | | |
|---|---|---|---|---|
| 5,629,999 A * | 5/1997 | Henry | ............... | G02B 6/10 385/27 |
| 6,298,178 B1 * | 10/2001 | Day | ............... | G02B 6/12 385/129 |
| 6,928,223 B2 * | 8/2005 | Walpole | ............... | H01S 5/227 385/131 |
| 8,451,874 B2 * | 5/2013 | Huang | ............... | H01S 5/2231 372/43.01 |
| 8,649,639 B2 * | 2/2014 | Mekis | ............... | G02B 6/26 385/14 |
| 2002/0051615 A1 * | 5/2002 | Walpole | ............... | H01S 5/227 385/131 |
| 2005/0147356 A1 * | 7/2005 | Mohseni | ............... | B82Y 20/00 385/50 |
| 2006/0109542 A1 * | 5/2006 | Mizuuchi | ............... | G02F 1/3775 359/330 |
| 2011/0150010 A1 * | 6/2011 | Huang | ............... | H01S 5/2231 372/6 |
| 2011/0217002 A1 * | 9/2011 | Mekis | ............... | G02B 6/26 385/28 |

FOREIGN PATENT DOCUMENTS

| | | |
|---|---|---|
| JP | 2008-91910 A | 4/2008 |
| JP | 2011-75917 A | 4/2011 |

* cited by examiner

HIGH-ORDER MODE FILTER

This application is a National Stage Entry of PCT/JP2013/066709 filed on Jun. 18, 2013, which claims priority from Japanese Patent Application 2012-211015 filed on Sep. 25, 2012, the contents of all of which are incorporated herein by reference, in their entirety.

TECHNICAL FIELD

The present invention relates to a high-order mode filter which reduces high-order mode light in an optical waveguide and leaky mode light accompanying it.

BACKGROUND ART

In optical elements having an optical waveguide, in order to prevent the high-order mode light in the optical waveguide and the leaky mode light accompanying it (hereinafter, referred to collectively as "high-order mode light") from causing the performance degradation of the optical elements, a high-order mode filter is known which reduces the high-order mode light. For example, Patent Literature 1 discloses a semiconductor laser diode in which a ridge portion is formed on the semiconductor substrate and grooves are formed between the ridge portion and clad regions which are located on the both sides of the ridge portion. The semiconductor laser diode realizes a single transverse mode by means of the configuration in which a top face of the clad region is located above the level of bottom faces of the grooves and a top face of the ridge portion is located above the level of the top face of the clad region.

CITATION LIST

Patent Literature

[PTL 1]
Japanese Patent No. 4094756

SUMMARY OF INVENTION

Technical Problem

According to the high-order mode filter described in Patent Literature 1, it is possible to eliminate the high-order mode light from the inside of the optical waveguide relatively easily. However, although the eliminated high-order mode light gets out of propagation in the optical waveguide, it is dissipated peripherally through the clad region or the slab region and becomes stray light in the optical element. In particular, in a silicon optical integrated circuit and an optical element with a plurality of functional elements integrated which have been actively researched in recent years, it has become a problem that the stray light causes a negative effect on some part other than the optical waveguide. For example, various problems occur that the stray light increases a noise in an optical signal propagating in other parts or it worsens the properties of a multiplexing/branching device working in the other parts.

The present invention is made in order to solve the problems, and the object is to provide a high-order mode filter which keeps a fundamental mode loss low suppressing the occurrence of the stray light and efficiently eliminates the high-order mode light.

Solution to Problem

A rib waveguide type high-order mode filter according to an exemplary aspect of the present invention includes a plate-like slab region; a projection portion formed in a stripe along a waveguiding direction of light on the slab region; and a mesa region having a bottom surface positioned at the same level as that of the bottom surface of the slab region and a top surface positioned at a higher level than that of the top surface of the slab region, on at least one side of the slab region, wherein the projection portion, the slab region, and the mesa region are made of the same material; and the mesa region includes a doped area in which an optical-absorption function is added by impurity doping into the material.

Advantageous Effects of Invention

According to the high-order mode filter of the present invention, it is possible to keep a fundamental mode loss low suppressing the occurrence of the stray light and efficiently eliminate the high-order mode light in various optical elements having an optical waveguide.

BRIEF DESCRIPTION OF DRAWINGS

FIG. 11b is a cross-sectional view of the high-order mode filter shown in FIG. 11a taken along the line a-a of FIG. 11a.

FIG. 12b is a cross-sectional view of the high-order mode filter shown in FIG. 12a taken along the line b-b of FIG. 12a.

FIG. 13b is a cross-sectional view of the high-order mode filter shown in FIG. 13a taken along the line c-c of FIG. 13a.

DESCRIPTION OF EMBODIMENTS

The exemplary embodiments of the present invention will be described with reference to drawings below.

Figure 1:
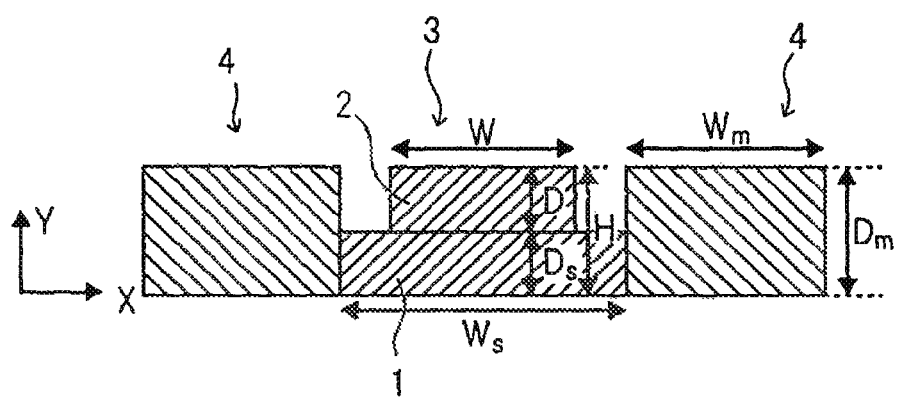
FIG. 1 is a cross-sectional view schematically illustrating an optical waveguide underlying a high-order mode filter of the present invention.

Initially, a basic structure of a high-order mode filter in accordance with the present invention will be described. As shown in FIG. 1, the high-order mode filter includes an optical waveguide (rib waveguide) 3 which is composed of a plate-like slab region 1 and a projection portion (ridge portion) 2 formed in a stripe along a waveguiding direction of light on the slab region 1. The high-order mode filter includes a mesa region 4 which has a bottom surface positioned at the same level as that of the bottom surface of the slab region 1 and a top surface positioned at a higher level than that of the top surface of the slab region 1, on one side or both sides of the projection portion 2 and the slab region 1. The projection portion 2, the slab region 1, and the mesa region 4 are made of the same material, and impurities are doped in the mesa region 4.

The rib waveguide 3 is designed to confine the light in the transverse direction (X direction) by means of the projection portion 1. It is possible to use as materials composing the rib waveguide 3, for example, semiconductors such as Si, Ge, SiGe, SiC, SiSn, PbS, PbSe, GaAs, InP, GaP, GaN, GaAlAs, GaInAsP, and ZeSe, and dielectrics such as $LiNbO_3$. Impurities doped in those materials include B, As, P, Zn, S, Se, Ge, In, Sb, Ga, Al, C, O, H, Au, Na, Li, Cu, Te, Sn, Cr, Be, Mn, Er, Mg, Fe, and Ar, for example. It is only necessary for the periphery surrounding the rib waveguide 3, not shown in the figure, to have a lower refraction index than those of the projection portion 2 and the slab region 1, and it is acceptable that there exists a solid, a gas such as the air, or a liquid such as the water, and also acceptable to be a vacuum.

Next, detailed structures of the high-order mode filters of a plurality of embodiments in accordance with the present invention will be described referring to drawings. In the following descriptions, in order to show specific performances, the rib waveguide 3 is used as a model in which the projection portion 2, the slab region 1, and the mesa region 4 are composed of Si, and a clad region surrounding the periphery, not shown in the figure, is composed of $SiO_2$. The results of theoretical calculation using a three-dimension beam propagation method are shown as necessary. The wavelength of the light for the calculation is equal to 1.55 μm in a vacuum, a refraction index of Si for that wavelength is equal to 3.48, and a refraction index of $SiO_2$ is equal to 1.46. Structural parameters are as follows: a width of the projection portion 2 (width of rib waveguide 3) W=1.4 μm, a height of the rib waveguide 3 H=1.0 μm, a height of the projection portion 2 D=0.5 μm, a thickness of the slab region 1 Ds=0.5 μm, a width of the slab region Ws=2.2 μm, and a height of the mesa region 4 Dm=1.0 μm. The calculation is performed under the condition that the width of the mesa region 4 Wm is semi-infinite because equivalent results can be obtained even if Wm is regarded as semi-infinite practically when it is about ten times as long as or longer than the wavelength. Doping concentration Nd of the impurity doping in the mesa region 4 is set at Nd=$1 \times 10^{20}$ cm$^{-3}$. If impurities such as B and P are doped in Si at a concentration of Nd=$1 \times 10^{20}$ cm$^{-3}$, the optical absorption of about 0.4 dB/μm arises in the impurity doped area due to generated free carriers. A decrease in refraction index by about 0.1 arises due to the carrier plasma effect. Although it is a slight change of the refraction index considering that the refraction index of Si is equal to 3.48 originally, the characteristic is taken advantage of in the present invention and consequently it becomes possible to keep a fundamental mode loss low suppressing the occurrence of the stray light and efficiently eliminate the high-order mode light.

Figure 2A:
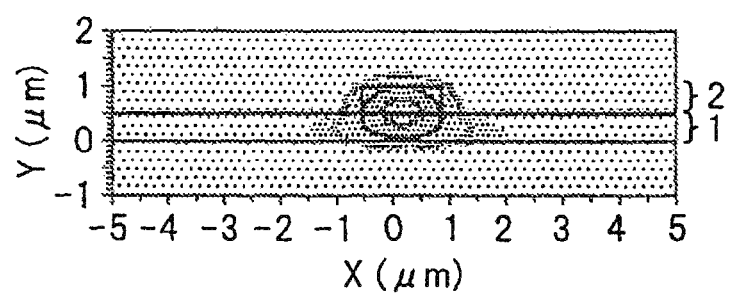
FIG. 2*a* is an explanatory diagram illustrating an electric field amplitude profile of a fundamental mode and a TE-like mode electric field amplitude profile (X component) of an optical waveguide without a mesa region.
Figure 2B:
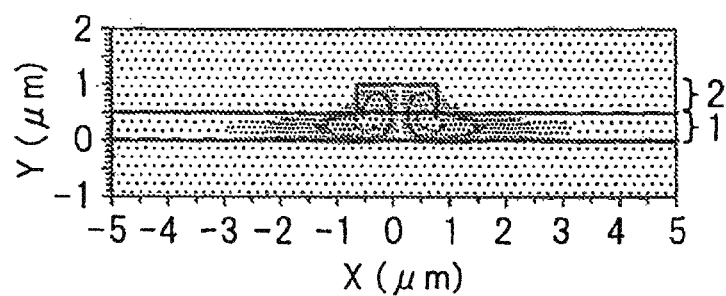
FIG. 2*b* is an explanatory diagram illustrating an electric field amplitude profile of a first-order mode and a TE-like mode electric field amplitude profile (X component) of an optical waveguide without a mesa region.

FIG. 2 shows an electric field amplitude profile of a TE-like propagation mode (X component) using shading of dots if it is assumed that there is no mesa region 4 (that is, the width Ws of the slab region 1 is equal to or wider than 10 μm). There exists in the rib waveguide 3 not only the fundamental mode shown in FIG. 2a but also a first-order mode shown in FIG. 2b as a propagation mode.

In exemplary embodiments of the present invention described below, when a specific performance is discussed, the first-order mode light is regarded as the high-order mode light to be eliminated, and a loss which the light energy of the high-order mode light existing as the propagation mode suffers while it propagates through an optical waveguide 1 mm long, is called a high-order mode loss. Similarly, a loss which the light energy of the fundamental mode light existing as the propagation mode suffers while it propagates through an optical waveguide 1 mm long, is called the fundamental mode loss. The high-order mode filter is generally required to keep the fundamental mode loss low and increase the high-order mode loss at the same time. However, as described above, even though the high-order mode loss is high, it causes many problems if the high-order mode light eliminated from an optical waveguide becomes a stray light. It is therefore important to effectively transform the eliminated high-order mode light energy into a different form near the optical waveguide. The specific forms exemplified in the above explanations do not limit the technical scope of the present invention.

The First Exemplary Embodiment

Figure 3:
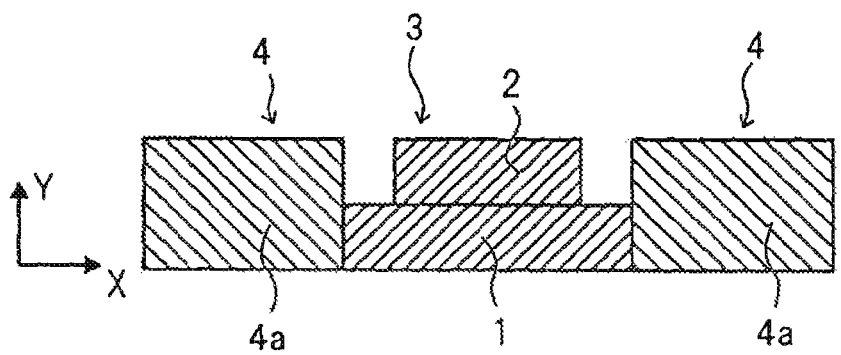
FIG. 3 is a cross-sectional view schematically illustrating a high-order mode filter in accordance with the first embodiment of the present invention.

The first exemplary embodiment of the present invention is described using FIG. 3. FIG. 3 is a cross-sectional view schematically illustrating a high-order mode filter in accordance with the first exemplary embodiment. Impurities are doped in the entire area of the mesa region 4. If impurities are not doped in the mesa region 4, the high-order mode light eliminated from the rib waveguide 3 is scattered to the surrounding area through the slab region 1, the mesa region 4, the clad region, and a substrate and so on, and a lot of stray light arises in an optical element. On the other hand, in the high-order mode filter of the present exemplary embodiment shown in FIG. 3, since the function of light absorption is applied to the mesa region 4 by impurity doping, the high-order mode light eliminated from the rib waveguide 3 is absorbed in the mesa region 4 and most of it is transformed from light energy into thermal energy. Therefore it is suppressed for the stray light to arise.

The high-order mode loss is equal to 55 dB/mm which is obtained by the results of the theoretical calculation using the three-dimension beam propagation method when the above-described structural parameters are applied to the high-order mode filter shown in FIG. 3. That is to say, the high-order mode light is eliminated by 90% or more in the high-order mode filter while propagating 200 μm. It is confirmed that almost all of eliminated high-order mode light is absorbed in the mesa region 4 within ±10 μm in the X direction from the projection portion 1, and that the occurrence of the stray light can be suppressed.

In addition, since the refraction index is decreased in the doped area due to the carrier plasma effect, it is possible to confine the fundamental mode light due to the difference in the refraction index between the doped area and the non-doped area. It enables the fundamental mode light to be confined within or near the projection portion 1 that there exists the impurity-doped mesa region 4 lateral to the projection portion 1. This enables the fundamental mode loss to be suppressed. For example, in cases of the rib waveguide 3 in which Si is used as the material of the projection portion 1, the slab region 2, and the mesa region 4, and $SiO_2$ is used as the material of the clad region surrounding them, the decrease in the refraction index induced in the doped area does not extend beyond 0.1 and is very small compared with the difference of the refraction index between Si and $SiO_2$. Therefore, it is thought that the influence of such refraction index change can be negligible. However, the theoretical calculation by the inventor has shown that the electric field of the fundamental mode light leaking into the slab region 1 can be confined within the mesa region 4 depending on the slight refraction index change in the high-order mode filter of the present invention. This makes it possible to decrease the electric field of the fundamental mode light penetrating the mesa region 4, and prevent the fundamental mode light from being dissipated into the mesa region 4.

It is confirmed by the results of the theoretical calculation using the three-dimension beam propagation method that the fundamental mode loss can be reduced to 0.6 dB/mm if impurities are doped in the mesa region 4 whereas it is equal to 5.2 dB/mm before the impurity doping, when the above-mentioned structural parameters are applied to the high-order filter shown in FIG. 3.

It is necessary to form the projection portion 2, the slab region 1, and the mesa region 4 by using the same material in order to obtain the effect of the invention effectually. The reason is that it is necessary to match stably the refraction indexes of the projection portion 2, the slab region 1, and the mesa region 4 with each other with an error equal to or less than about 1% because the electric field penetrating the slab region 1 is very sensitive to the difference in the refraction index in the high-order mode light propagating in the rib waveguide 3. In the present exemplary embodiment and all the exemplary embodiments described below, a slight change of the refraction index induced by the impurity doping is taken advantage of, on the assumption the projection portion 2, the slab region 1, and the mesa region 4 are made of the same material.

The Second Exemplary Embodiment

Figure 4:
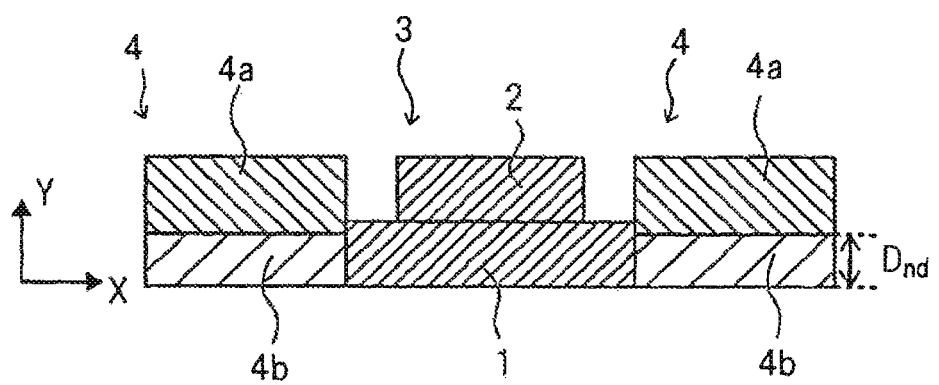
FIG. 4 is a cross-sectional view schematically illustrating a high-order mode filter in accordance with the second embodiment of the present invention.

Next, FIG. 4 shows the high-order mode filter in the second exemplary embodiment the present invention. In the present exemplary embodiment, the mesa region 4 includes an upper doped area 4a and a non-doped area 4b Dnd high adjacent to the lower part of the doped area 4a. This structure enables the electric field of the high-order mode light to penetrate the mesa region 4 through the non-doped area 4b and the high-order mode light to be absorbed effectively in the doped area 4a.

The high-order mode loss increases to 157 dB/mm which is obtained by the results of the theoretical calculation using the three-dimension beam propagation method when the structural parameters above described are applied to the high-order filter shown in FIG. 4 and the height of the non-doped area Dnd is set at 0.4 μm. In this case, it is also confirmed that almost all of eliminated high-order mode light is absorbed in the mesa region 4 within ±10 μm in the X direction from the projection portion 2, and that the occurrence of the stray light can be suppressed.

As can be seen from FIG. 2a and FIG. 2b, the high-order mode light is insusceptible to the non-doped area in the presence of it because the amount of the electric field penetrating the slab region 1 is inherently small in the case of the fundamental mode light compared with the high-order mode light. Therefore, as is the case with the first exemplary embodiment, it is possible to keep the fundamental mode loss low because the fundamental mode light is confined near the projection portion 2 due to the effect of the decrease in the refraction index by impurity doping. It is confirmed that the high-order mode loss can be reduced to 0.4 dB/mm which is obtained by the results of the theoretical calculation using the three-dimension beam propagation method when the above-described structural parameters are applied to the high-order filter shown in FIG. 4 and the height of the non-doped area Dnd is set at 0.4 μm.

In light of effectively eliminating the high-order mode light with the fundamental mode loss suppressed, it is desirable for the height of the non-doped area Dnd and the thickness of the slab region Ds to satisfy the following formula (1).

$$0 < Dnd < Ds \qquad (1)$$

The reason is that, if the condition is satisfied, the electric field of the fundamental mode light penetrating the slab region 1 is confined nearer to the projection portion 2 due to the presence of the doped area 4a having a low refraction index projecting below the top face of the slab region 1.

Figure 5:
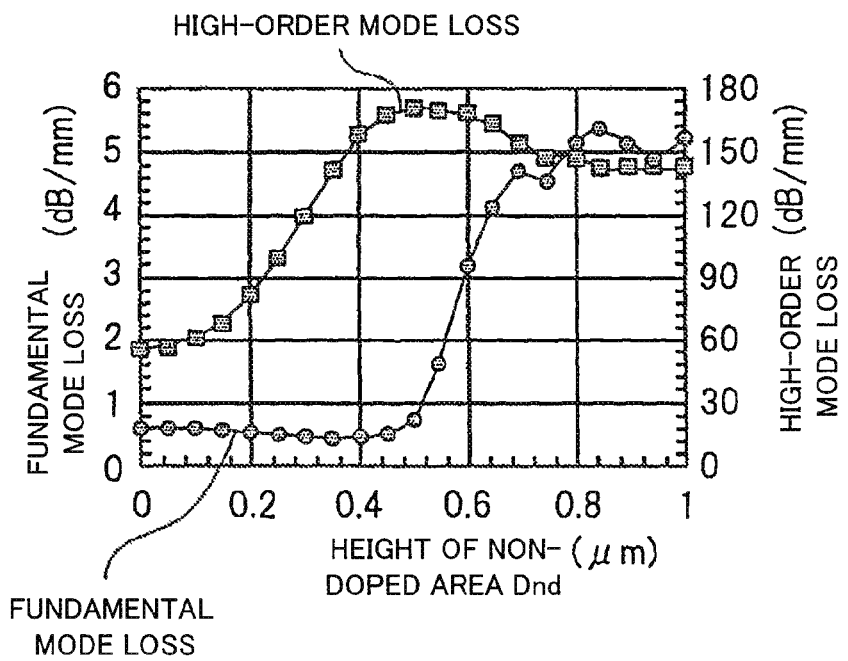
FIG. 5 is a graph illustrating the relations between a fundamental mode loss and a high-order mode loss, and a height of a non-doped area Dnd in the high-order mode filter shown in FIG. 4.

FIG. 5 shows the results obtained by calculating relations between the fundamental mode loss and the high-order mode loss, and the height of the non-doped area 4b Dnd (the dependence of the fundamental mode loss and the high-order mode loss on the height of the non-doped area 4b Dnd). In FIG. 5, it is confirmed that it is possible to effectively suppress the penetration of the electric field of the fundamental mode light into the slab region 1 in the presence of a slight amount of it and to largely suppress the fundamental mode loss when Dnd<Ds (that is, Dnd<Dm/2=0.5 µm). On the other hand, the high-order mode loss can be kept high relatively according to the above-mentioned principle even though Dnd<Ds. In the present exemplary embodiment, therefore, it is desirable to satisfy formula (1) in order to suppress the fundamental mode loss maintaining functions of suppressing the stray light and eliminating the high-order mode light.

The Third Exemplary Embodiment

Figure 6:
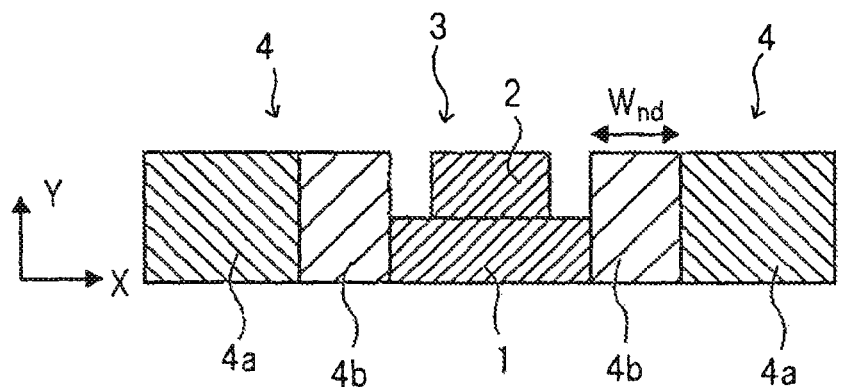
FIG. 6 is a cross-sectional view schematically illustrating a high-order mode filter in accordance with the third embodiment of the present invention.

FIG. 6 illustrates a high-order mode filter in the third exemplary embodiment of the present invention. In the present exemplary embodiment, the mesa region 4 is composed of a non-doped area 4b located close and opposite to the projection portion 2, and a doped area 4a located outside it. The theoretical calculation by the inventor has shown that the non-doped area 4b located on the inside end of the mesa region 4 can become a core of the optical waveguide propagating thorough the mesa region 4 with the doped area 4a having a decreased refraction index as a side clad in the present exemplary embodiment. An optical mode is called "a mesa region waveguide mode" by which the light propagates through the optical waveguide with the non-doped area 4b of the mesa region 4 composing the core and the doped area 4a composing the clad as mentioned above. That is to say, in this structure, there exist the fundamental mode (rib waveguide fundamental mode) light propagating thorough the rib waveguide 3 (projection portion), the high-order mode light (rib waveguide high-order mode) propagating thorough the rib waveguide 3 (projection portion), the fundamental mode light propagating thorough the mesa region 4, and the high-order mode light propagating thorough the mesa region 4. In those kinds of the light, it is required to eliminate the high-order mode light propagating thorough the rib wave guide 3 (projection portion). Since it is not required to eliminate one of the fundamental mode light propagating thorough the mesa region 4 and the high-order mode light propagating thorough the mesa region 4 and it is unnecessary to deal with them distinctively, they are collectively called "a mesa region waveguide mode" in the following descriptions.

If an effective refraction index for the mesa region waveguide mode assuming the absence of the projection portion 2 is close to an effective refraction index for the rib waveguide high-order mode assuming the absence of the mesa region 4, a great effect of eliminating the rib waveguide high-order mode light is obtained with the two optical modes combining and with the high-order mode light propagating thorough the rib waveguide 3 effectively transferring to the mesa region 4. On the other hand, if the effective refraction index for the mesa region waveguide mode assuming the absence of the projection portion 2 is separated from the effective refraction index for the rib waveguide fundamental mode assuming the absence of the mesa region 4 so that the rib waveguide fundamental mode may not combine with the mesa region waveguide mode, it is possible to suppress the rib waveguide fundamental mode loss.

Therefore, if the difference between the effective refraction index for the mesa region waveguide mode assuming the absence of the projection portion 2 and the effective refraction index for the rib waveguide high-order mode to be eliminated assuming the absence of the mesa region 4 is made smaller than the difference between the effective refraction index for the mesa region waveguide mode assuming the absence of the projection portion 2 and the effective refraction index for the rib waveguide fundamental mode assuming the absence of the mesa region 4, it is possible to suppress the fundamental mode loss and effectively eliminate the high-order mode light.

As is the case with the first and the second exemplary embodiments, since the high-order mode light eliminated from the optical waveguide is absorbed in the mesa region 4 by the optical-absorption function added by impurity doping, it becomes possible to suppress the occurrence of the stray light.

Figure 7:
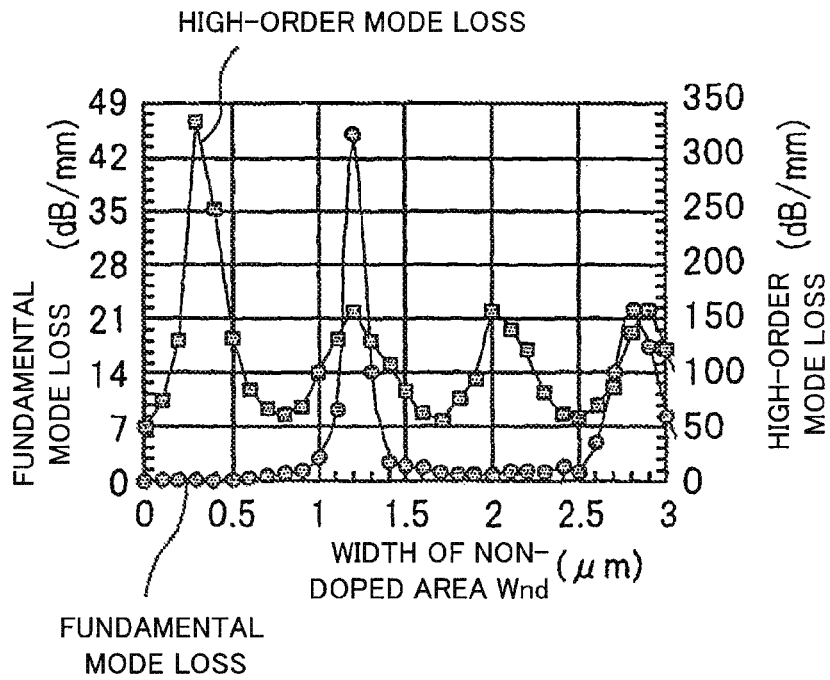
FIG. 7 is a graph illustrating the relations between a fundamental mode loss and a high-order mode loss, and a height of a non-doped area Dnd in the high-order mode filter shown in FIG. 6.

FIG. 7 shows the results obtained by calculating relations between the fundamental mode loss and the high-order mode loss, and the width of the non-doped area 4b Wnd (the dependence of the fundamental mode loss and the high-order mode loss on the width of the non-doped area 4b Wnd), applying the above-mentioned structural parameters to the high-order mode filter shown in FIG. 6. Since the effective refraction index for the mesa region waveguide mode becomes close to the effective refraction index for the rib waveguide high-order mode when Wnd=0.3 µm according to the above-mentioned principle, the high-order mode light propagating thorough the rib waveguide 3 is effectively transferred to the mesa region 4 and absorbed. As a result, the high-order mode loss is increased to 333 dB/mm. On the one hand, since the effective refraction index for the mesa region waveguide mode is separated from the effective refraction index for the rib waveguide fundamental mode, the rib waveguide fundamental mode cannot combine with the mesa region waveguide mode, and therefore, it is possible to prevent the fundamental mode light from transferring to the mesa region 4. Consequently, the fundamental mode loss can be reduced to 0.3 dB/mm. Since the effective refraction index for the mesa region waveguide mode becomes close to the effective refraction index for the rib waveguide high-order mode even when Wnd=1.2 µm, the high-order mode loss is increased to 156 dB/mm. However, in this case, since the effective refraction index for the mesa region waveguide mode also becomes close to the effective refraction index for the rib waveguide fundamental mode, the fundamental mode loss is also increased to 45 dB/mm, which is undesirable for the high-order mode filter. As mentioned above, it is possible to eliminate an unwanted light mode only controlling the number of the mesa region waveguide modes and the effective refraction index by adjusting the width of the non-doped area 4b Wnd.

In this case, it is confirmed that almost all of eliminated high-order mode light is absorbed in the mesa region 4 within ±10 µm in the X direction from the projection portion 2, and that the occurrence of the stray light can be suppressed, regardless of the value of Wnd.

The Fourth Exemplary Embodiment

Figure 8:
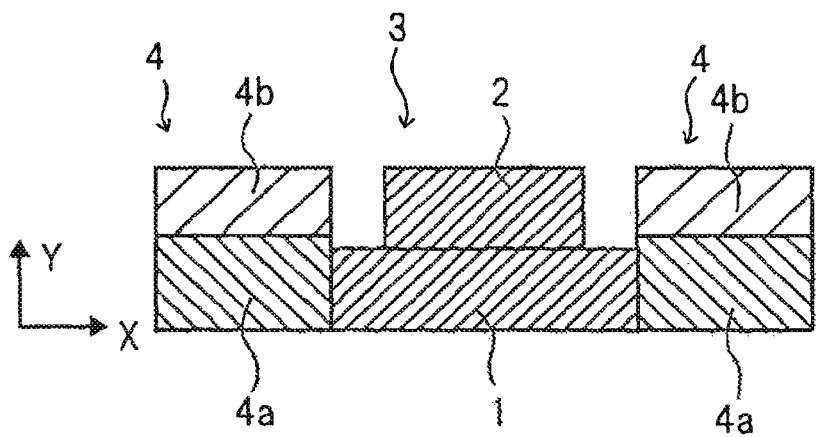
FIG. 8 is a cross-sectional view schematically illustrating a high-order mode filter in accordance with the fourth embodiment of the present invention.

FIG. 8 shows a high-order mode filter in the fourth exemplary embodiment of the present invention. In the present exemplary embodiment, the mesa region 4 includes a lower doped area 4a and a non-doped area 4b adjacent to the upper part of the doped area 4a. In this structure, the non-doped area 4b located at the top part of the mesa region 4 can become a core of the mesa region waveguide mode with the doped area 4a having a decreased refraction index as a lower clad. Therefore, as is the case with the third exemplary embodiment, if the difference between the effective refraction index for the mesa region waveguide mode assuming the absence of the projection portion 2 and the effective refraction index for the rib waveguide high-order mode assuming the absence of the mesa region 4 is made smaller than the difference between the effective refraction index for the mesa region waveguide mode assuming the absence of the projection portion 2 and the effective refraction index for the rib waveguide fundamental mode assuming the absence of the mesa region 4, it is possible to suppress the fundamental mode loss and effectively eliminate the high-order mode light. Since the high-order mode light eliminated from the optical waveguide is absorbed in the mesa region 4 by the optical-absorption function added by impurity doping, it becomes possible to suppress the occurrence of the stray light.

The Fifth Exemplary Embodiment

Figure 9A:
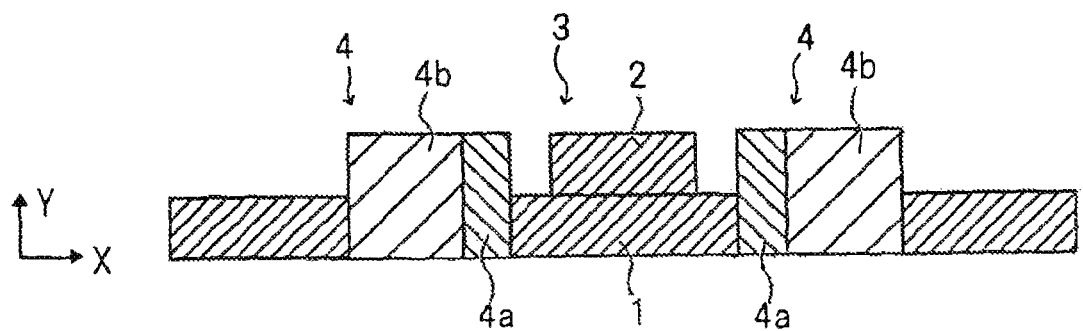
FIG. 9*a* is a cross-sectional view schematically illustrating a high-order mode filter in accordance with the fifth embodiment of the present invention.
Figure 9B:
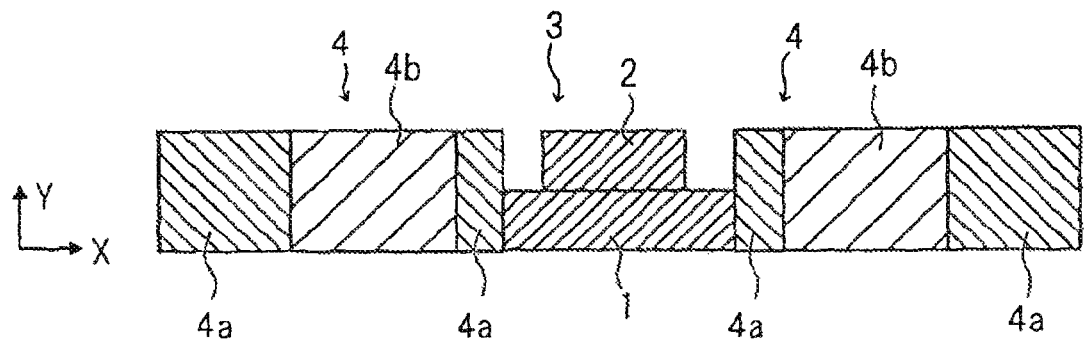
FIG. 9*b* is a cross-sectional view schematically illustrating a modification of a high-order mode filter shown in FIG. 9*a*.
Figure 10A:
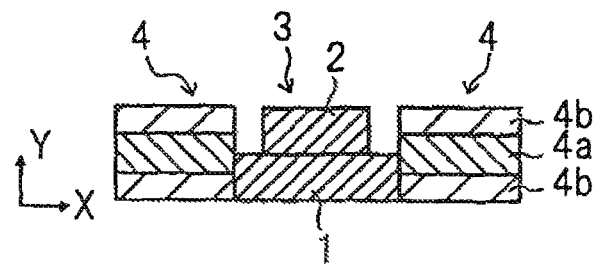
FIG. 10*a* is a cross-sectional view schematically illustrating a high-order mode filter in accordance with another embodiment of the present invention.
Figure 10B:
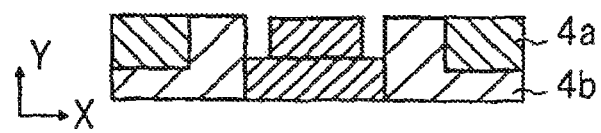
FIG. 10b is a cross-sectional view schematically illustrating a high-order mode filter in accordance with another embodiment of the present invention.
Figure 10C:
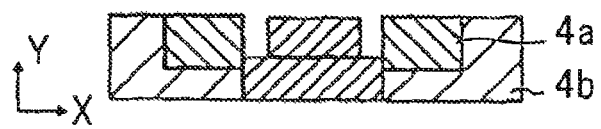
FIG. 10c is a cross-sectional view schematically illustrating a high-order mode filter in accordance with another embodiment of the present invention.
Figure 10D:
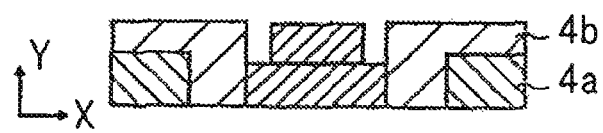
FIG. 10d is a cross-sectional view schematically illustrating a high-order mode filter in accordance with another embodiment of the present invention.
Figure 10E:
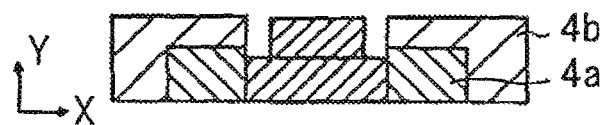
FIG. 10e is a cross-sectional view schematically illustrating a high-order mode filter in accordance with another embodiment of the present invention.
Figure 10F:
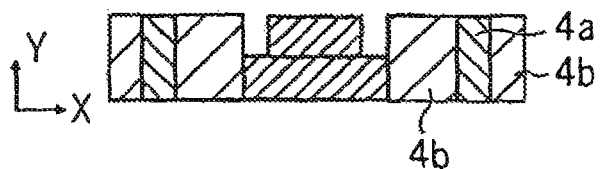
FIG. 10f is a cross-sectional view schematically illustrating a high-order mode filter in accordance with another embodiment of the present invention.
Figure 10G:
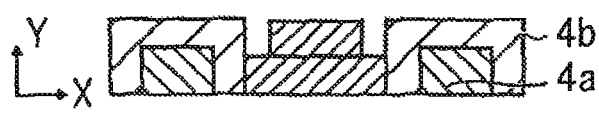
FIG. 10g is a cross-sectional view schematically illustrating a high-order mode filter in accordance with another embodiment of the present invention.
Figure 10H:
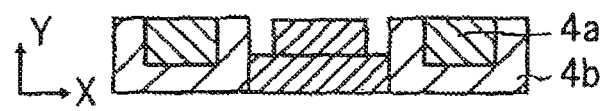
FIG. 10h is a cross-sectional view schematically illustrating a high-order mode filter in accordance with another embodiment of the present invention.
Figure 10I:
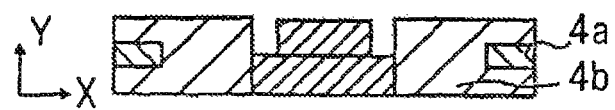
FIG. 10i is a cross-sectional view schematically illustrating a high-order mode filter in accordance with another embodiment of the present invention.
Figure 10J:
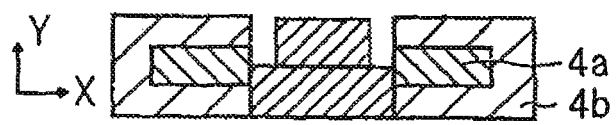
FIG. 10j is a cross-sectional view schematically illustrating a high-order mode filter in accordance with another embodiment of the present invention.
Figure 10K:
FIG. 10k is a cross-sectional view schematically illustrating a high-order mode filter in accordance with another embodiment of the present invention.

FIG. 9a and FIG. 9b illustrates a high-order mode filter in the fifth exemplary embodiment of the present invention. In the present exemplary embodiment, as shown in FIG. 9a, the mesa region 4 is composed of a doped area 4a located close and opposite to the projection portion 2 and a non-doped area 4b located outside it. In the present exemplary embodiment, the non-doped area 4b located on the outside end of the mesa region 4 can become a core of the optical waveguide propagating thorough the mesa region 4 with the doped area 4a having a decreased refraction index as a side clad. Therefore, if the difference between the effective refraction index for the mesa region waveguide mode assuming the absence of the projection portion 2 and the effective refraction index for the rib waveguide high-order mode to be eliminated assuming the absence of the mesa region 4 is made smaller than the difference between the effective refraction index for the mesa region waveguide mode assuming the absence of the projection portion 2 and the effective refraction index for the rib waveguide fundamental mode assuming the absence of the mesa region 4, it is possible to suppress the fundamental mode loss and effectively eliminate the high-order mode light. Since the high-order mode light eliminated from the optical waveguide is absorbed in the mesa region 4 by the optical-absorption function added by impurity doping, it becomes possible to suppress the occurrence of the stray light.

As a modification of the present exemplary embodiment, it is acceptable to be configured to include another doped area 4a located further outside the non-doped area 4b as shown in FIG. 9a. According to this structure, substantially similar advantageous effect can be also obtained.

In the second to the fifth exemplary embodiments of the present invention described above, the non-doped area 4b is disposed on any one of the upper, the lower, the right side, and the left side of the doped area 4a of the mesa region 4. However, as various exemplary embodiments shown in FIG. 10a to FIG. 10k, it is also acceptable for the non-doped area 4b to be disposed on two, three or all of the upper, the lower, the right side, and the left side of the doped area 4a. In these cases, because of the principle similar to that in any one of the second to the fifth exemplary embodiments, it is possible to configure the high-order mode filter which can suppress the occurrence of the stray light and has high performance to eliminate the high-order mode.

The high-order filter of the present invention can have an arbitrary size of the mesa region width Wm. As the examples of the calculation described above, it makes no difference whether the mesa region width Wm is extremely large in comparison to the rib waveguide width W or is comparable in size to the rib waveguide width W. If the mesa region width Wm is nearly equal to the rib waveguide width W, it is possible to adjust the effective refraction index for the mesa region waveguide mode by adjusting the mesa region width Wm. This enables the high-order mode eliminating performance to be improved and a specific high-order mode to be selected and eliminated.

The high-order mode filter of the present invention is described above as an example which is configured to satisfy the following formula (2) with respect to the mesa region height Dm and the rib waveguide height H.

$$Dm=H \tag{2}$$

However, even if the relation of Dm>H or Dm<H is satisfied, the similar advantageous effect can be obtained according to the present invention. If the relation of Dm=H is satisfied, a process for making the mesa region 4 is not added because the rib waveguide 3 and the mesa region 4 can be formed in a lump and simultaneously. Specifically, for example, it is possible to form the projection portion 2 and the mesa region 4 simultaneously by one process for making etching masks, one etching process, and one process for removing etching masks. Therefore, it is preferable to satisfy the relation of Dm=H if ease of manufacturing is required.

Although the high-order filter of the present invention is basically configured for the doped area 4a to be disposed within the mesa region 4, the doped area 4a can be disposed slightly spreading out of the mesa region 4. However, it is necessary to configure the doped area 4a not too close to the projection portion 2 so that the fundamental mode light may not suffer a large loss.

In the high-order mode filter of the present invention, it is acceptable to vary the position and the size of each of the mesa region 4, the doped area 4a, the non-doped area 4b, and the projection portion 2 along the longitudinal direction (light waveguide direction) of the rib waveguide 3. It is also acceptable that the position and the size of the mesa region 4, the doped area 4a, and the non-doped area 4b differ from each other on the sides (right side and left side) of the projection portion 2. If a left-right asymmetrical shape is used as mentioned above, it is possible to enlarge a tolerance of dimension error in manufacturing the high-order mode filter actually and to provide high-order mode eliminating performance stably. If there are a plurality of high-order modes to be eliminated, it is possible to be designed for relatively high eliminating performance for all the high-order modes.

Figure 11A:
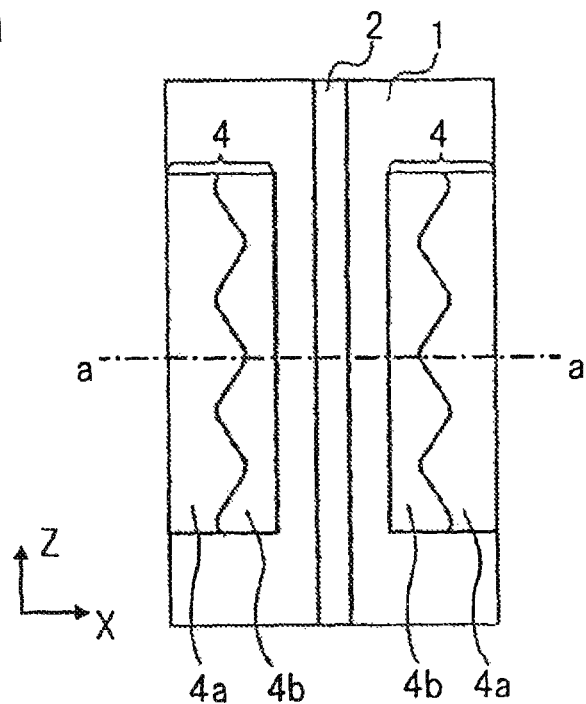
FIG. 11a is a plan view schematically illustrating a modification of a high-order mode filter in accordance with the third embodiment of the present invention.
Figure 11B:
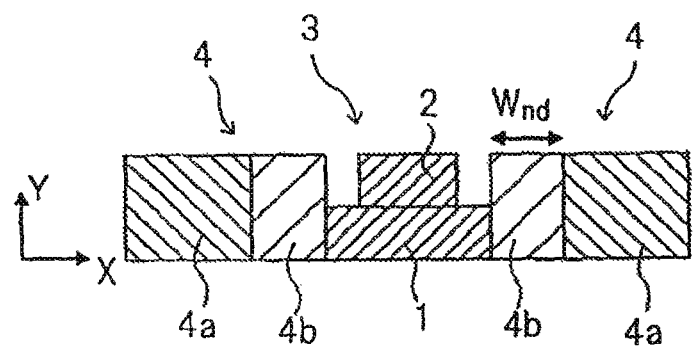

For example, as shown in FIG. 11a and FIG. 11b, in the configuration in which the width of the non-doped area 4b Wnd varies along the longitudinal direction (light waveguide direction) of the rib waveguide 3 (the modification in the third exemplary embodiment), the effective refraction index for the mesa region waveguide mode, that is, the light propagating thorough the mesa region 4 with the non-doped area 4b as the core, also varies along the longitudinal direction. Therefore, even if there is a manufacturing error, it is possible to obtain a large high-order mode eliminating effect because it coincides with the effective refraction index for the rib waveguide high-order mode to be eliminated somewhere in the non-doped area 4b.

Figure 12A:
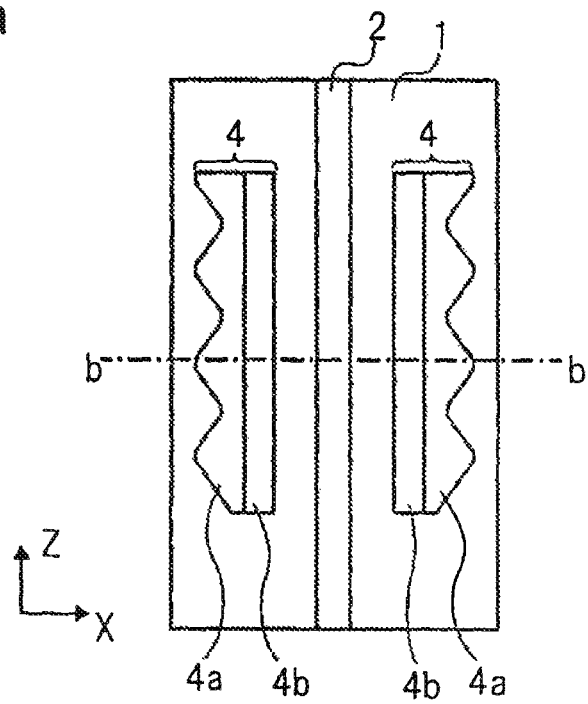
FIG. 12a is a plan view schematically illustrating another modification of a high-order mode filter in accordance with the third embodiment of the present invention.
Figure 12B:
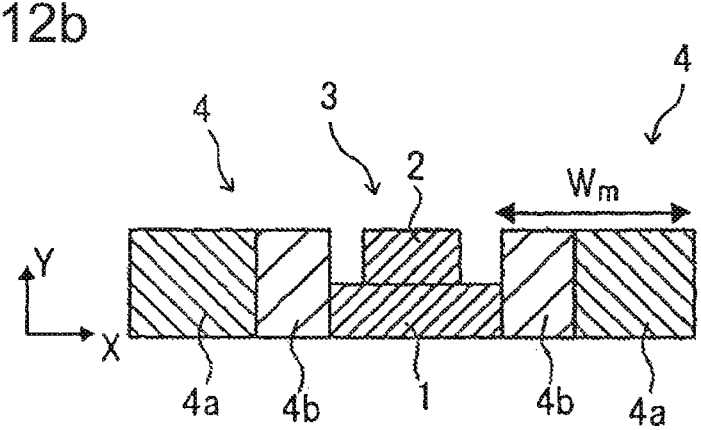

As shown in FIG. 12a and FIG. 12b, even in the configuration in which the width of the mesa region 4 Wm varies along the longitudinal direction (light waveguide direction) of the rib waveguide 3, the effective refraction index for the mesa region waveguide mode of the light propagating thorough the mesa region 4 varies along the longitudinal direction. Therefore, even if there is a manufacturing error, it is possible to obtain a large high-order mode eliminating effect because it coincides with the effective refraction index for the rib waveguide high-order mode to be eliminated somewhere in the mesa region 4. In addition, even in the configuration, not shown in the figure, in which the width of the projection portion 2 W varies along the longitudinal direction (light waveguide direction) of the rib waveguide 3, the similar effect can be obtained.

As shown in FIG. 12a and FIG. 12b, if the width Wm of the end of the beginning side (light incident side) on the mesa region 4 in the high-order mode filter is made smaller, it is possible to prevent the light propagating thorough the rib waveguide 3 from being reflected at the start point of the high-order mode filter.

If the width of the mesa region 4 Wm and the width of the projection portion 2 W vary along the longitudinal direction, and uneven parts are formed at the interface between the material composing the core of the rib waveguide 3 and the material composing the clad, there is the potential for stray light to occur due to scattering by the uneven parts. On the other hand, as the configurations shown in FIG. 11a and FIG. 11b, if uneven parts are formed at the interface between the doped area 4a and the non-doped area 4b, less stray light occurs due to a small difference of the refraction index between the doped area 4a and the non-doped area 4b is small.

Figure 13A:
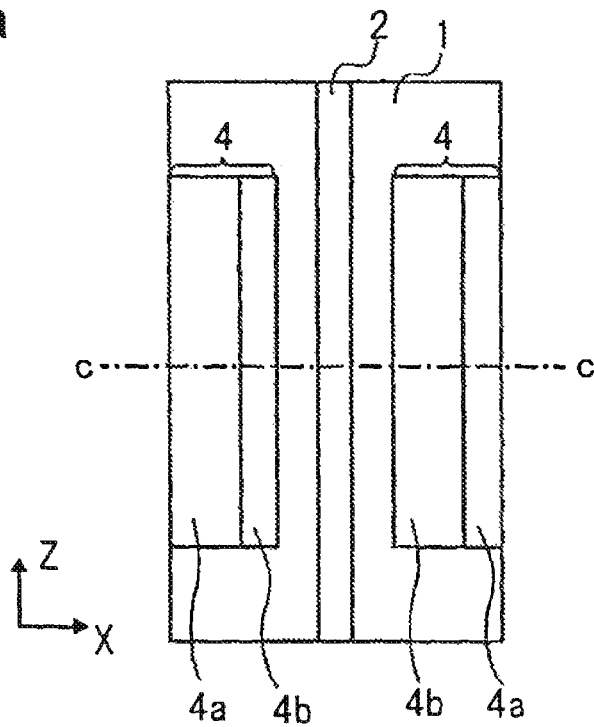
FIG. 13a is a plan view schematically illustrating another modification of a high-order mode filter in accordance with the third embodiment of the present invention.
Figure 13B:
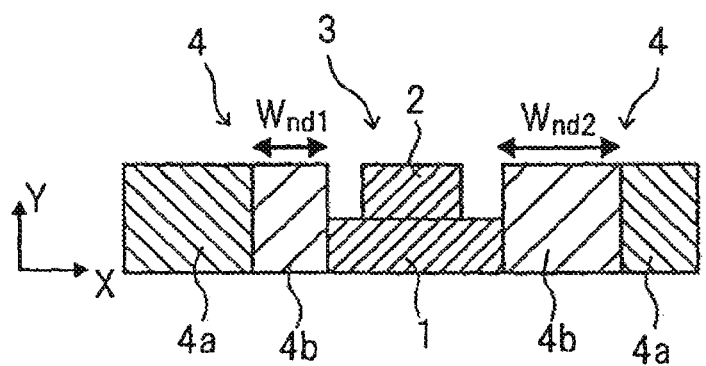

FIG. 13a and FIG. 13b schematically illustrate configurations (the modification in the third exemplary embodiment) in which the widths of the non-doped area Wnd differ from each other on the sides (left and right) of the projection portion 2. If there are two high-order modes to be eliminated for example, it is possible to set the width of the non-doped area Wnd1 on the left side of the projection portion 2 in accordance with one high-order mode to be removed and to set the width of the non-doped area Wnd2 on the right side of the projection portion in accordance with the other high-order mode to be removed. Thus it is possible to obtain a large high-order mode eliminating effect for all of a plurality of high-order modes to be eliminated.

It is also acceptable that the mesa region 4 is disposed on the only one side of the both sides (left and right) of the projection portion 2 in the high-order mode filter of the present invention. This enables another structure to be formed at a position in the side of the projection portion 2, where the mesa region 4 is not formed, and it is possible to make the fundamental mode loss smaller. Although the mesa region 4 is formed on the both sides of the projection portion 2, the doped area 4a can be formed on the only one side.

Figure 14:
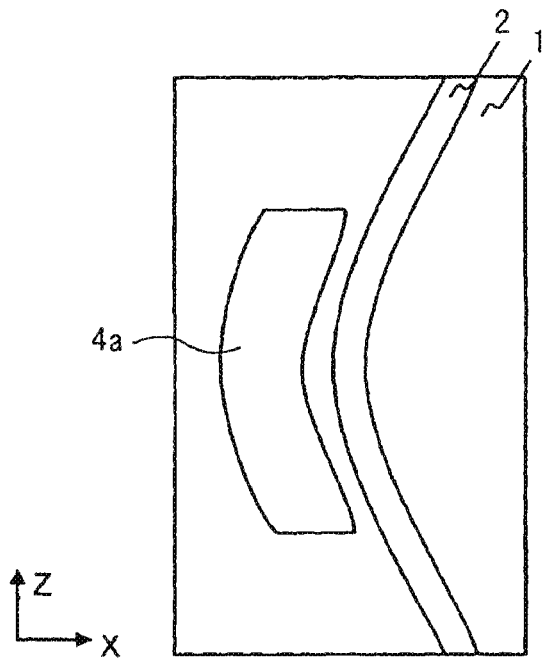
FIG. 14 is a plan view schematically illustrating a modification of the high-order mode filter in accordance with the first embodiment of the present invention.

In the high-order mode filter of the present invention, it is also acceptable that the basic rib waveguide 3 is a curved waveguide and the projection portion 2 is formed in a curved line. The electric field of the light propagating thorough the curved waveguide largely penetrates the slab region 1 toward the outer peripheral side of the curved waveguide. In this case, since the electric field of the high-order mode light penetrates more largely than that of the fundamental mode light, it is possible to increase the high-order mode loss further keeping the fundamental mode loss low. It is also acceptable that the position and the size of the mesa region 4, the doped area 4a, and the non-doped area 4b differ from each other between the outer peripheral side and the inner peripheral side of the curved waveguide. As shown in FIG. 14, it is also acceptable that at least one of the mesa region 4 and the doped area 4a is formed only on the outer peripheral side (the modification of the first exemplary embodiment).

Figure 15:
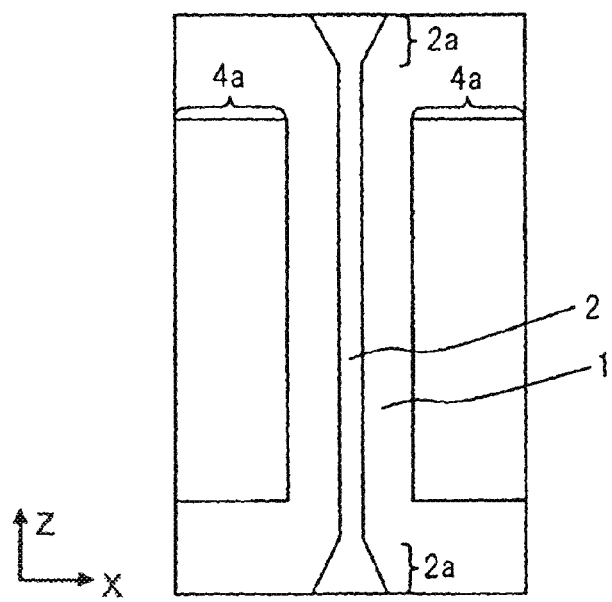
FIG. 15 is a plan view schematically illustrating another modification of the high-order mode filter in accordance with the first embodiment of the present invention.

It is also acceptable that the high-order mode filter of the present invention, as shown in FIG. 15, has a tapered structure 2a in which the width of the projection portion 2 continuously varies near at least one of the start end and the terminal end of the high-order mode filter (the modification example of the first exemplary embodiment). Generally, in the rib waveguide 3, the larger the width of the projection portion 2 W is, the smaller the waveguide loss of the fundamental mode light becomes. However, in the high-order mode filter, since the electric field of the high-order mode light largely penetrates the slab region 1 as the width of the projection portion 2 W becomes smaller, it is possible to increase the high-order mode loss. Therefore, it is effective to increase the width of the projection portion 2 w in the outside of the high-order mode filter without the mesa region 4, to decrease the width of the projection portion 2 W in the inside of the high-order mode filter with the mesa region 4, and to form the tapered structure 2a in order to connect them to each other with a low loss.

The doped area 4a is an area in which the following formula (5) is satisfied, where Nd represents an impurity doping concentration and Nth represents a lower limit impurity doping concentration at which the effect of the present invention is produced.

$$Nd \geq Nth \tag{5}$$

The non-doped area 4b is an area in which the following formula (6) is satisfied.

$$Nd < Nth \tag{6}$$

The value of Nth depends on the performance required for the high-order mode filter and a material of the waveguide 3, and for example, Nth is approximately equal to $10^{19}$ cm$^{-3}$ in the rib waveguide 3 composed of silicon which is used in the above calculation. It is acceptable that the doping concentration Nd varies slowly near the boundary between the doped area 4a and the non-doped area 4b.

The whole or part of the exemplary embodiments disclosed above can be described as, but not limited to, the following supplementary notes.

(Supplementary Note 1)

A rib waveguide type high-order mode filter, comprising:
a plate-like slab region;
a projection portion formed in a stripe along a waveguiding direction of light on the slab region; and
a mesa region having a bottom surface positioned at the same level as that of the bottom surface of the slab region and a top surface positioned at a higher level than that of the top surface of the slab region, on at least one side of the slab region,
wherein the projection portion, the slab region, and the mesa region are made of the same material; and the mesa region comprises a doped area in which an optical-absorption function is added by impurity doping into the material.

(Supplementary Note 2)

The high-order mode filter according to Supplementary note 1,
wherein a refraction index in the doped area is decreased due to the impurity doping as compared to the material located around the doped area; and
the mesa region comprises a non-doped area located on at least one of the upper, the lower, the right side, and the left side of the doped area.

(Supplementary Note 3)

The high-order mode filter according to Supplementary note 2,
wherein the non-doped area is formed below the doped area; and
the height of the non-doped area Dnd and the thickness of the slab region Ds satisfy a relation of 0<Dnd<Ds.

(Supplementary Note 4)

The high-order mode filter according to Supplementary note 2 or 3,
wherein the non-doped area formed adjacent to the doped area becomes a core through which the light propagates in the mesa region; and
a size of the non-doped area and a width of the mesa region are set so that the difference between the effective refraction index for a mesa region waveguide mode assuming the absence of the projection portion and the effective refraction index for a high-order mode to be eliminated and to propagate through the projection portion may become smaller than the difference between the effective refraction index for the mesa region waveguide mode assuming the absence of the projection portion and the effective refraction index for a fundamental mode propagating through the projection portion assuming the absence of the mesa region.

(Supplementary Note 5)

The high-order mode filter according to any one of Supplementary notes 2, 3, and 4,
wherein one of a position and a size of at least one of the doped area and the non-doped area is uneven and varies along the direction in which the light propagates through the projection portion.

(Supplementary Note 6)

The high-order mode filter according to any one of Supplementary notes 2, 3, 4, and 5,
wherein at least one of the doped area and the non-doped area has an asymmetric structure in which one of the position, shape, and size differs from each other on the sides of the projection portion.

(Supplementary Note 7)

The high-order mode filter according to any one of Supplementary notes 1, 2, 3, 4, 5, and 6,
wherein a relation of Dm=H is satisfied by the height of the mesa region Dm and a height of a rib waveguide H of the sum of the thickness of the slab region and the height of the projection portion.

(Supplementary Note 8)

The high-order mode filter according to any one of Supplementary notes 1, 2, 3, 4, 5, 6, and 7,
wherein the projection portion, the slab region, and the mesa region are made of silicon.

(Supplementary Note 9)

The high-order mode filter according to any one of Supplementary notes 1, 2, 3, 4, 5, 6, 7, and 8,
wherein one of a position and a size of at least one of the mesa region and the projection portion is uneven and varies along the direction in which the light propagates through the projection portion.

(Supplementary Note 10)

The high-order mode filter according to any one of Supplementary notes 1, 2, 3, 4, 5, 6, 7, 8, and 9,
wherein the mesa region has an asymmetric structure in which one of the position, shape, and size differs from each other on the sides of the projection portion.

(Supplementary Note 11)

The high-order mode filter according to any one of the supplementary note 1 to the supplementary note 10, wherein the mesa region has an asymmetric structure in which both ends of the projection portion are different in position, shape, or size from each other.

(Supplementary Note 12)

The high-order mode filter according to any one of the supplementary note 1 to the supplementary note 11, wherein the projection portion is formed in a curved line shape.

(Supplementary Note 13)

The high-order mode filter according to any one of the supplementary note 1 to the supplementary note 12, wherein the projection portion includes a tapered structure in which the width continuously varies on at least one of a start-end and a terminal end.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2012-211015, filed on Sep. 25, 2012, and the disclosure of which is incorporated herein in its entirety by reference.

REFERENCE SIGNS LIST

1 slab region
2 projection portion
3 optical waveguide (rib waveguide)
4 mesa region
4a doped area
4b non-doped area

What is claimed is:

1. A rib waveguide type high-order mode filter, comprising:
a plate-like slab region;
a projection portion formed in a stripe along a waveguiding direction of light on the slab region; and
a mesa region having a bottom surface positioned at the same level as that of the bottom surface of the slab region and a top surface positioned at a higher level than that of the top surface of the slab region, on at least one side of the slab region in a transverse direction parallel to at least one of the bottom surface of the mesa region and the top surface of the mesa region,
wherein the projection portion, the slab region, and the mesa region are made of the same material;
the mesa region comprises a doped area in which an optical-absorption function is added by impurity doping into the material;
a refraction index in the doped area is decreased due to the impurity doping as compared to the material located around the doped area; and
the mesa region comprises a non-doped area located on at least one of a side above the doped area, a side below the doped area, a right side of the doped area, and a left side of the doped area.

2. The high-order mode filter according to claim 1,
wherein the non-doped area is formed below the doped area; and the height of the non-doped area Dnd and the thickness of the slab region Ds satisfy a relation of $0<Dnd<Ds$.

3. The high-order mode filter according to claim 1, wherein the non-doped area formed adjacent to the doped area becomes a core through which the light propagates in the mesa region; and a size of the non-doped area and a width of the mesa region are set so that the difference between the effective refraction index for a mesa region waveguide mode assuming the absence of the projection portion and the effective refraction index for a high-order mode to be eliminated and to propagate through the projection portion may become smaller than the difference between the effective refraction index for the mesa region waveguide mode assuming the absence of the projection portion and the effective refraction index for a fundamental mode propagating through the projection portion assuming the absence of the mesa region.

4. The high-order mode filter according to claim 1, wherein one of a position and a size of at least one of the doped area and the non-doped area is uneven and varies along the direction in which the light propagates through the projection portion.

5. The high-order mode filter according to claim 1, wherein at least one of the doped area and the non-doped area has an asymmetric structure in which one of the position, shape, and size differs from each other on the sides of the projection portion.

6. The high-order mode filter according to claim 1, wherein a relation of Dm=H is satisfied by the height of the mesa region Dm and a height of a rib waveguide H of the sum of the thickness of the slab region and the height of the projection portion.

7. The high-order mode filter according to claim 1, wherein the projection portion, the slab region, and the mesa region are made of silicon.

8. The high-order mode filter according to claim 1, wherein one of a position and a size of at least one of the mesa region and the projection portion is uneven and varies along the direction in which the light propagates through the projection portion.

9. The high-order mode filter according to claim 1, wherein the mesa region has an asymmetric structure in which one of the position, shape, and size differs from each other on the sides of the projection portion.

10. The high-order mode filter according to claim 2, wherein the non-doped area formed adjacent to the doped area becomes a core through which the light propagates in the mesa region; and a size of the non-doped area and a width of the mesa region are set so that the difference between the effective refraction index for a mesa region waveguide mode assuming the absence of the projection portion and the effective refraction index for a high-order mode to be eliminated and to propagate through the projection portion may become smaller than the difference between the effective refraction index for the mesa region waveguide mode assuming the absence of the projection portion and the effective refraction index for a fundamental mode propagating through the projection portion assuming the absence of the mesa region.

11. The high-order mode filter according to claim 2, wherein one of a position and a size of at least one of the doped area and the non-doped area is uneven and varies along the direction in which the light propagates through the projection portion.

12. The high-order mode filter according to claim 3, wherein one of a position and a size of at least one of the doped area and the non-doped area is uneven and varies along the direction in which the light propagates through the projection portion.

13. The high-order mode filter according to claim 2, wherein at least one of the doped area and the non-doped area has an asymmetric structure in which one of the position, shape, and size differs from each other on the sides of the projection portion.

14. The high-order mode filter according to claim 3, wherein at least one of the doped area and the non-doped area has an asymmetric structure in which one of the position, shape, and size differs from each other on the sides of the projection portion.

15. The high-order mode filter according to claim 4, wherein at least one of the doped area and the non-doped area has an asymmetric structure in which one of the position, shape, and size differs from each other on the sides of the projection portion.

16. The high-order mode filter according to claim 1, wherein a relation of Dm=H is satisfied by the height of the mesa region Dm and a height of a rib waveguide H of the sum of the thickness of the slab region and the height of the projection portion.

17. The high-order mode filter according to claim 1, wherein the projection portion, the slab region, and the mesa region are made of silicon.

18. The high-order mode filter according to claim 1, wherein one of a position and a size of at least one of the mesa region and the projection portion is uneven and varies along the direction in which the light propagates through the projection portion.

19. The high-order mode filter according to claim 1, wherein the mesa region has an asymmetric structure in which one of the position, shape, and size differs from each other on the sides of the projection portion.

* * * * *